United States Patent
Kahn et al.

(10) Patent No.: US 6,725,362 B2
(45) Date of Patent: Apr. 20, 2004

(54) METHOD FOR ENCODING AN INSTRUCTION SET WITH A LOAD WITH CONDITIONAL FAULT INSTRUCTION

(75) Inventors: Opher D. Kahn, Zichron (IL); Robert C. Valentine, Kiriat Tivon (IL)

(73) Assignee: Intel Corporation, Santa Clara, CA (US)

( * ) Notice: Subject to any disclaimer, the term of this patent is extended or adjusted under 35 U.S.C. 154(b) by 500 days.

(21) Appl. No.: 09/776,849

(22) Filed: Feb. 6, 2001

(65) Prior Publication Data

US 2002/0147902 A1 Oct. 10, 2002

(51) Int. Cl.$^7$ ................................................ G06F 9/312
(52) U.S. Cl. ..................... 712/225; 712/23; 712/226; 712/244
(58) Field of Search ................................ 712/225, 244, 712/23, 226

(56) References Cited

U.S. PATENT DOCUMENTS 5,712,997 A  *  1/1998  Dice ........................... 712/217

* cited by examiner

*Primary Examiner*—Kenneth S. Kim
(74) *Attorney, Agent, or Firm*—Kenyon & Kenyon (57) ABSTRACT

The present invention relates to a method and system for providing a load with conditional fault instruction that includes an associated conditional operator, which enables load operations to be advanced above program branches by the compiler without causing unwarranted fault conditions. Specifically, the load instruction can be executed out of normal program order to enable information to be retrieved from memory before the information is needed, to permit the retrieved information to begin to be used before the conditional operator can be evaluated. Likewise, a dynamically scheduled processor can advance components of the instruction and further improve performance without having faults effect the normal program flow. The load instruction can stop the use of the information and replace the information with a predetermined, generally deterministic, value if the conditional operator indicates a faulty load operation.

23 Claims, 5 Drawing Sheets

METHOD FOR ENCODING AN INSTRUCTION SET WITH A LOAD WITH CONDITIONAL FAULT INSTRUCTION

FIELD OF THE INVENTION

The present invention relates to processor architectures and instruction sets, and in particular, to processor architectures with instruction sets that provide load with conditional fault instructions.

BACKGROUND

In modern processors, for example, a Central Processing Unit (CPU), execution of instructions occurs, in general, in the following sequential order: the CPU reads an instruction, the CPU decodes the instruction, and, then, the CPU executes the instruction. In older CPUs the clock speed of the processor was generally slow enough that the reading, decoding and executing of each instruction could occur in a single clock cycle. However, modern microprocessors have improved performance by going to shorter clock cycles (that is, higher frequencies). These shorter clock cycles tend to make instructions require multiple smaller sub-actions which can fit into the cycle time. Executing many such sub-actions in parallel, as in a pipelined and/or superscalar processor, can improve performance even further. For example, to execute the decoding portion of a simple multiplication instruction involves several steps, including: obtaining a first operand from the instruction, moving the first operand to an appropriate storage location, obtaining a second operand, multiplying the first and second operands, and storing the result in a result storage location. Included in these instruction steps are load operations, which can access the memory to obtain the operand(s) from a source memory location or register and then either store the operand(s) or the result of the multiplication operation into a destination register or registers, depending on the implementation. Unfortunately, the cycle time of microprocessor technology has decreased much more rapidly than that of off-die memory technology, hence load instructions/operations are experiencing long latency periods, which adversely affect processor efficiency and performance.

Therefore, what is needed is a method for providing early, that is, out-of-order, execution of load operations, as specified in an instruction, to obtain the necessary data before the data is needed for the execution of the instruction without causing unwarranted fault conditions.

DETAILED DESCRIPTION

In accordance with an embodiment of the present invention, a method for providing a load with conditional fault instruction to enable load operations to be advanced above branches by the compiler without causing unwarranted fault conditions. A dynamically scheduled processor, such as, an Intel® Pentium® Pro microprocessor from Intel Corporation of Santa Clara, Calif., can advance components of the instruction and further improve performance without having faults effect the normal program flow. To accomplish this goal, a dynamically scheduled processor compiler must be able to recognize the load instruction/operation in each instruction in an Instruction Set Architecture (ISA) and be able to move the load up so it can be executed earlier in the program. However, one problem with this feature is that in certain instances of program code execution the results of the advance loads may not be needed. For example, if a program has a loop code segment in which there are load instructions that need to be executed multiple, say 300, times and the loop is implemented with the advanced load capability, some advance loads may be performed up to, for example, iteration 304, which is outside of the loop termination condition of 300. Thus the loads for loop iterations 301 through 304, although logically sitting in the code, are not actually planned or needed to be executed by the operation of the loop code segment. As a result, the advance load execution of loop iterations 301 through 304 may have caused an error when it accessed or tried to access, for example, data from memory that results in a fault condition, a protected memory location or a non-existent memory location.

In order to prevent these types of errors from unnecessarily causing fatal program execution errors or, maybe more importantly, permitting unauthorized access to protected memory locations, in an embodiment of the present invention, a conditional operator is associated with the load instruction, which specifies the load behavior. For example, the conditional operator can be implemented as a condition register, a general purpose register or any other condition. Now, if during execution the load operation experiences an error or exception, the instruction can check the value of the conditional operator to determine how to handle the problem.

An important aspect, in accordance with embodiments of the present invention, is preventing unauthorized access to protected information. However, without any other control, if a memory access violation occurs during a load and the value of the conditional operator evaluates to FALSE, the FALSE value will prevent the program from taking the protection violation and, thus, end up loading the protected data. Depending on the application, this failure to protect the data can cause serious security breaches. For example, in a banking system confidential bank account passwords are being stored in a cache memory and a load with conditional fault instruction can be executed to erroneously read and store one of the passwords from the cache in the destination register specified in the instruction. If the conditional operator evaluates to FALSE, then the program will ignore the protection violation, load the protected password into the register and make the password available to the program. Therefore, to prevent access to protected data and memory locations, the load with conditional fault instruction needs to store a safe value when the ignored fault occurs. A "safe" value can be any deterministic value or even the prior register value.

In accordance with an embodiment of the present invention, the load with conditional fault instruction "breaks" into two pieces during execution to prevent the instruction from obtaining access to protected data and/or memory locations. For example, in accordance with an embodiment of the present invention, the load with conditional fault instruction breaks into the to following two basic operations:

1. A load operation to read the data from the specified memory location and then store the data in the destination location; and
2. A condition evaluation operation, which evaluates the conditional operator associated with the instruction to determine whether the conditional operator is either TRUE or FALSE.

If TRUE, then, the instruction behaves like a normal load operation and the instruction can take all of the exceptions taken by a normal load. If FALSE, then, a deterministic value is stored in the destination register to overwrite any protected or erroneous data obtained by the load operation. By storing a deterministic value, proper and deterministic behavior is assured, even when the result of the load is used in an improper manner. The "correct" operation of the load with conditional fault instruction performs the load and, at some point uses the condition to select between the false path (that is, the path in which the load with the FALSE condition occurred) and another correct path. With a deterministic result for every load that has a FALSE condition, the program behavior will be the same regardless of non-deterministic fault conditions such as page faults. While this may be the easiest to implement from a programming viewpoint, it may not necessarily be the solution that is the most performant, that is, the solution that provides the best performance for the processor.

In general, when a load reads the desired data into the destination register, it is desirable to be able to use the data as soon as the data is available in the destination register without having to wait for the conditional operator boolean value to be evaluated, this is especially true in an out-of-order (OOO) execution machine. However, this immediate use conflicts with the above mentioned security concerns. In general, there are several possible modes of operation, including: 1) fully deterministic; 2) performant, but non-deterministic; and 3) performant and deterministic. Each of these modes of operation will be more fully discussed below in association with FIGS. 4, 5 and 6, respectively.

In accordance with an embodiment of the present invention, the load operation can be independent of the boolean condition evaluation. In this embodiment of the present invention, the data value loaded by the load operation can be made available to the program as soon as the data value is loaded. Similarly, if the conditional operator is evaluated to be FALSE, then the instruction can be retired regardless of whether the load operation has finished execution and with or without termination of the load operation.

In accordance with an embodiment of the present invention, the load operation can be dependent on the boolean condition evaluation. In this embodiment of the present invention, the data loaded by the load operation is not made available to the program until the conditional operator is evaluated. This can be accomplished by keeping the data in a temporary memory location, such as, a protected register or by disabling the programs access to the destination register until the conditional operator has been evaluated.

As a result, in Table 1, in accordance with embodiments of the present invention, a truth table is presented which provides some possible values that can be used by the load instruction based on the type of error or exception that has occurred and the value of the conditional operator. For example, the first row in Table 1 presents the case of a successful load operation that did not cause any memory access violations. In this case, if the conditional operator is evaluated to be TRUE, then the data that was read by the load operation is stored in a destination

TABLE 1

| | CONDITIONAL OPERATOR | |
|---|---|---|
| | TRUE | FALSE |
| Load OK - w/o Access Violation | Store Read Data | Store Read Data or a "safe" value |
| Load OK - w/ Access Violation | Store a "safe" value | Store a "safe" value |
| Load Error (TLB Miss) - w/o Access Violation | Store Read Data | Store a "safe" value |
| Load Error (TLB Miss) - w/ Access Violation | Store a "safe" value | Store a "safe" value |
| Long Latency Load | Store Read Data | Store a "safe" value or do nothing | location, for example, a register, specified in the load instruction and made available to the programmer. Likewise, in this same case, if the conditional operator is evaluated to be FALSE, then either the data that was read by the load operation or a safe value can be stored in the register specified in the load instruction and made available to the program. However, care must be taken in the selection of the deterministic value to avoid introducing unintended execution errors. For example, using a "0" safe value as the denominator in a divide operation will cause a divide by zero error. In the cases without access violations the choice of which value is used in the FALSE conditional operator case is implementation dependent and, therefore, can vary as needed for each implementation. Storing the safe value when the conditional operator evaluates as FALSE may provide the most deterministic implementation, which can be useful for program debugging and may, also, be the easiest implementation from a programming standpoint. Unfortunately, this deterministic implementation may not be the most performant implementation.

Figure 1:
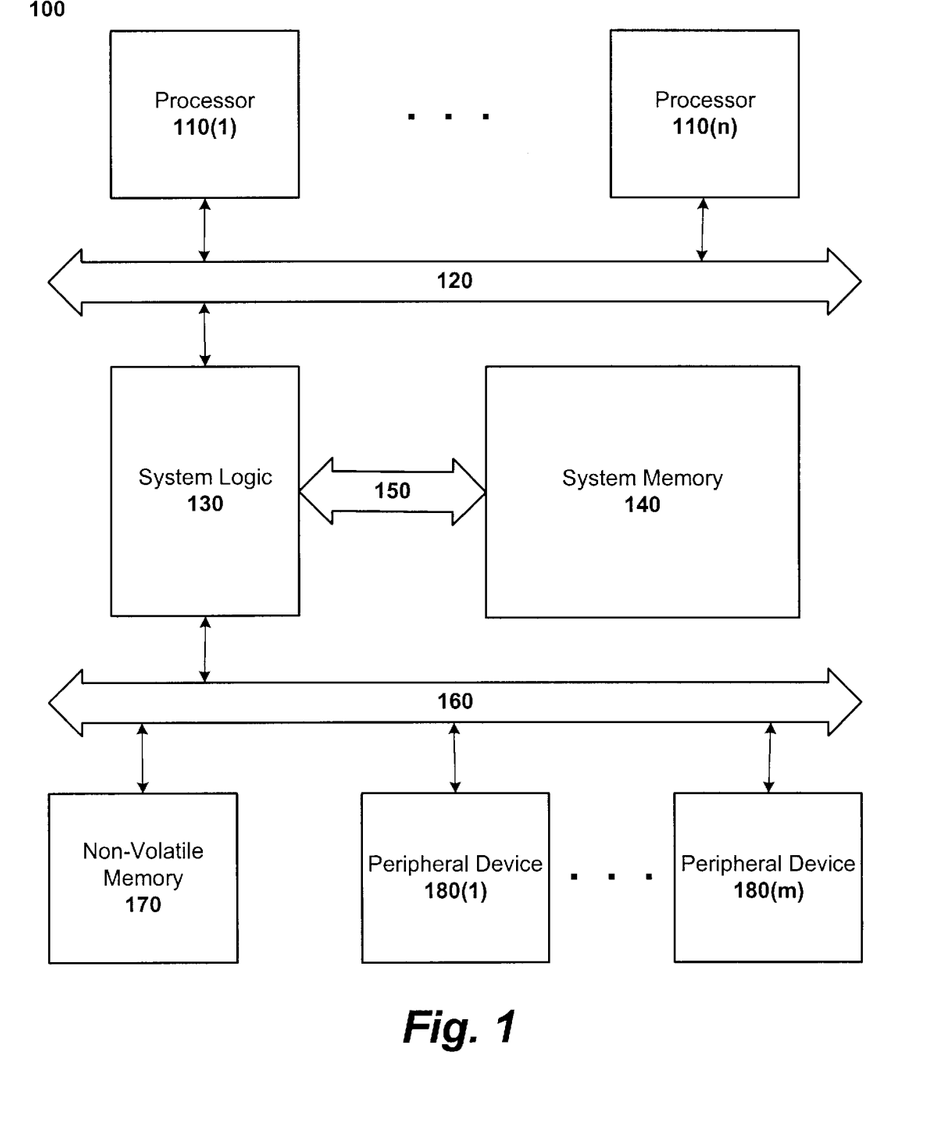
FIG. 1 is a block diagram of a computer system that includes an architectural state including registers and memory, in accordance with an embodiment of the present invention.

FIG. 1 is a block diagram of a computer system 100 that is suitable for implementing the present invention. In FIG. 1, the computer system 100 includes one or more processors 110(1)–110(n) coupled to a processor bus 120, which is in turn coupled to a system logic 130. Each of the one or more processors 110(1)–110(n) are N-bit processors and include one or more N-bit registers (not shown). The system logic 130 is in turn coupled to a system memory 140 through bus 150 and coupled to a non-volatile memory 170 and one or more peripheral devices 180(1)–180(m) through a peripheral bus 160. The peripheral bus 160 represents, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 170 may be a static memory device such as a read only memory (ROM) or a flash memory. Peripheral devices 180(1)–180(m) include, for example, a keyboard; a mouse or other pointing devices; mass storage devices such as hard disk drives, compact disc (CD) drives, optical disks, and digital video disc (DVD) drives; displays and the like.

Figure 2:
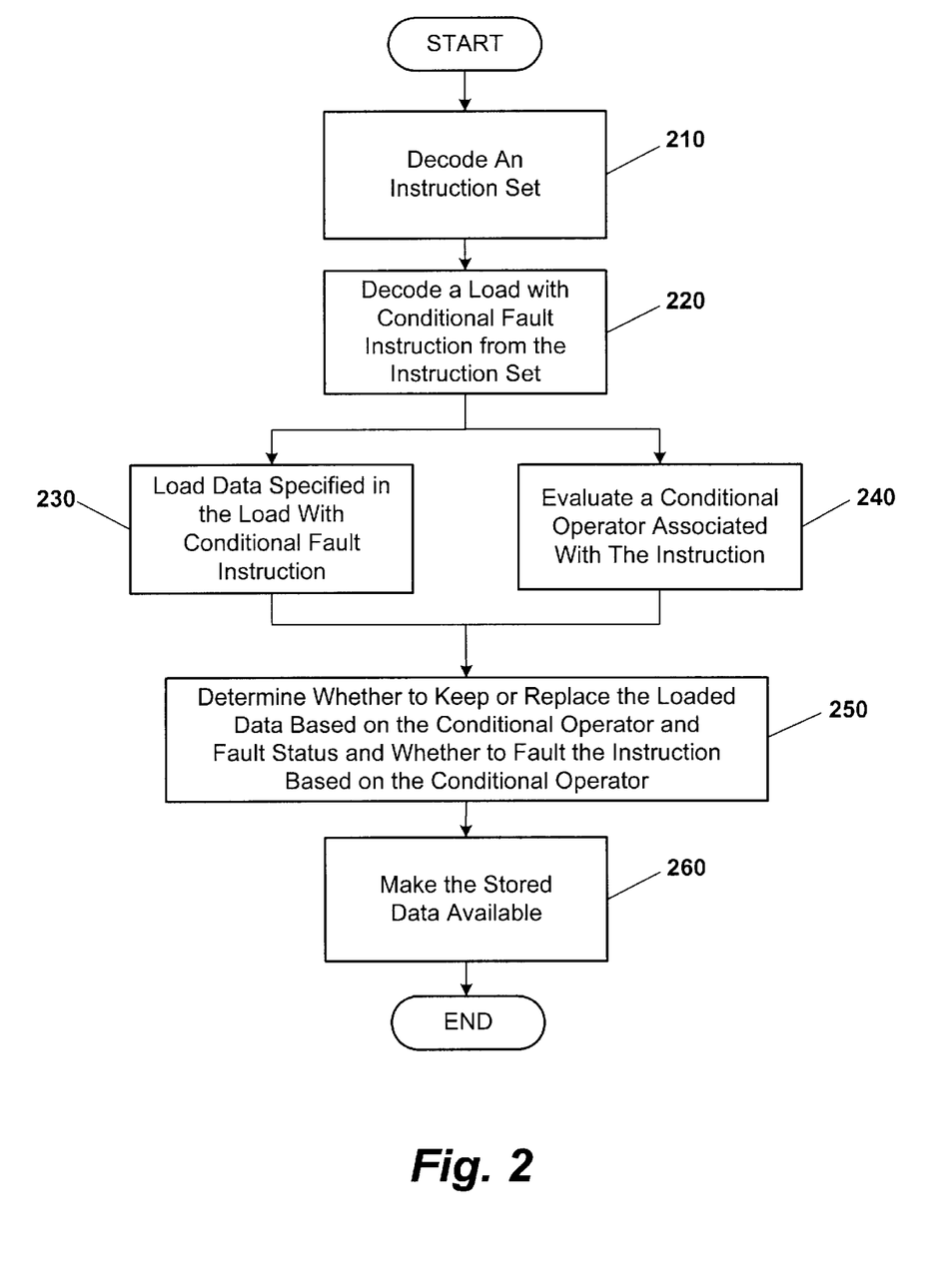
FIG. 2 is a flow diagram of a method for providing a load with conditional fault instruction in a processor, in accordance with an embodiment of the present invention.

FIG. 2 is a flow diagram of a method for providing a load with conditional fault instruction in a processor, in accordance with an embodiment of the present invention. In FIG. 2, an instruction set is decoded 210, which includes an operation code to indicate a load with conditional fault instruction. The load with conditional fault instruction also includes a conditional operator, which specifies the behavior of the load instruction. After the instruction set is decoded 210, the load with conditional fault instruction is decoded 220 and the load operation is executed 230 to read the specified data in a storage location that is not immediately made available for use by the program. In general, this storage location can be a temporary location, such as a variable or a register, or a destination register specified in the load with conditional fault instruction, which have not been made available for use by the program. Generally, the load operation can be executed in advance of program branch operations, and the immediate use of the results of the load operation can be permitted, regardless of whether a memory access violation occurred or the conditional operator evaluates to FALSE. The method and system also evaluate 240 the conditional operator to determine its value. In general, the load operation and conditional operator evaluation are independent of each other and, therefore, can occur in any order. After the load operation is executed 230 and the conditional operator is evaluated 240, the method and system can determine 250 whether to keep or replace the data value from the load operation based on the value of the conditional operator and fault status (that is, whether a memory access violation occurred), and whether the instruction should fault based on the conditional operator. After determining 250 whether to keep or replace the data value, the destination register can be made available 260 to the program, the fault can be executed if required, and the instruction execution can complete.

Figure 3:
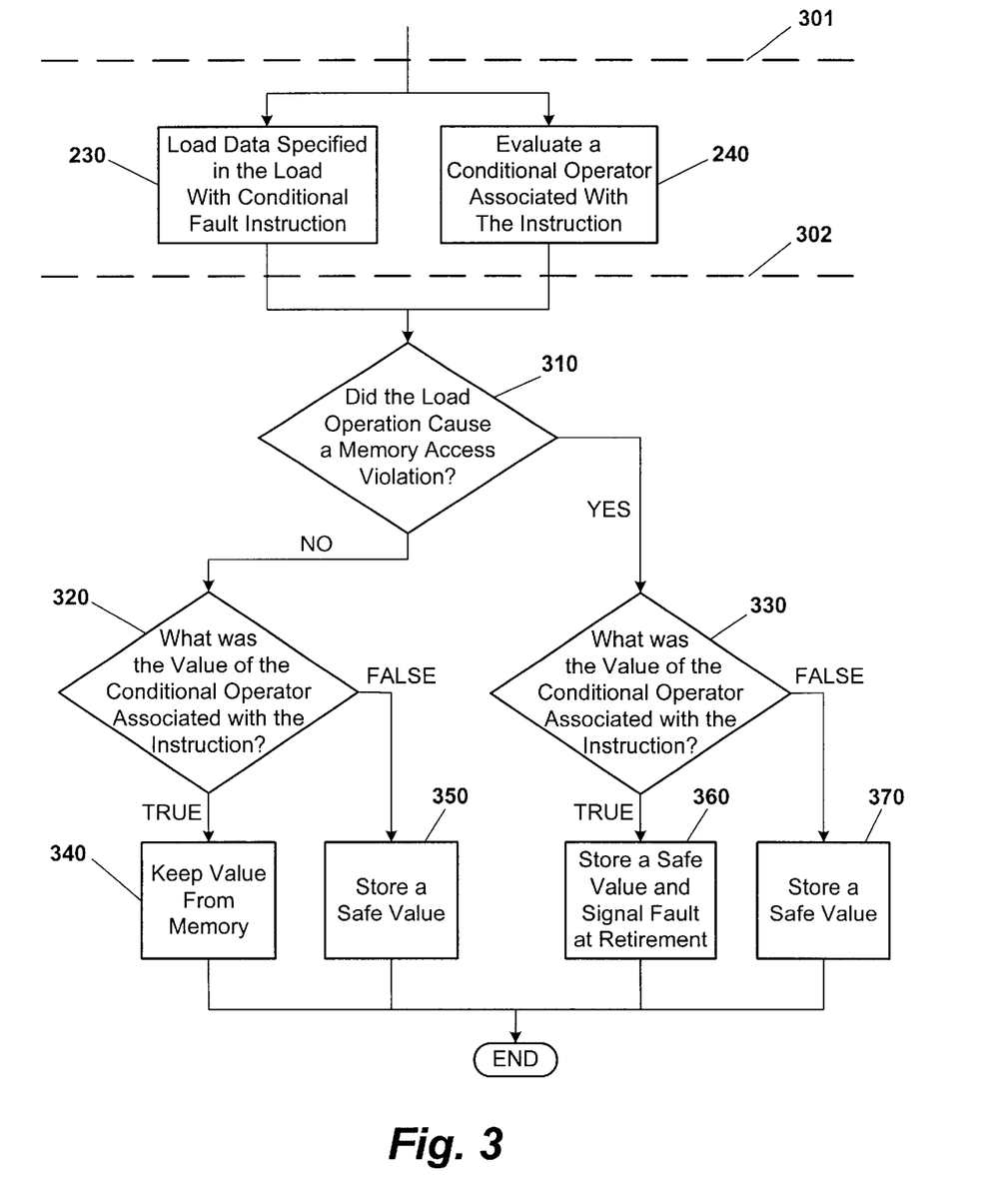
FIG. 3 is a flow diagram of a fully deterministic method of operation for a load with conditional fault instruction in a processor, in accordance with an embodiment of the present invention.

FIG. 3 is a flow diagram of a fully deterministic method of operation for the load with conditional fault instruction in FIG. 2, in accordance with an embodiment of the present invention. In FIG. 3, the load operation execution 230 and the conditional operator evaluation 240 are provided for the sake of clarity and remain unchanged from FIG. 2, however, additional detail has been provided for determining 250 whether to keep or replace the loaded data and whether to fault the instruction. In FIG. 3, dashed lines 301 and 302 indicate an any-order execution level for some of the operations in the load with conditional fault instruction, in which the operations shown within this "level" can be executed in any order with any of the other operations in the level. For example, in FIG. 3, since only the load operation execution 230 and the conditional operator evaluation 240 are shown within the any-order execution level, only they can be executed in any order.

In FIG. 3, a check is made to determine if the load operation caused a memory access violation 310. If it is determined 310 that NO, a memory access violation did not occur, the value of the conditional operator is determined 320 and if the conditional operator is TRUE, then, keep 340 the data obtained from the load operation in the destination register and the instruction retired. However, if the conditional operator evaluates to FALSE, then, a safe value can be stored 350 in the destination register and the instruction retired. In contrast, if it is determined 310 that YES, a memory access violation did occur, the value of the conditional operator is determined 320 and if the conditional operator is TRUE, then, a safe value can be stored in the destination register and a fault can be signaled 360 and the instruction retired. However, if the conditional operator evaluates to FALSE, then, a safe value can be stored 370 in the destination register and the instruction retired.

Figure 4:
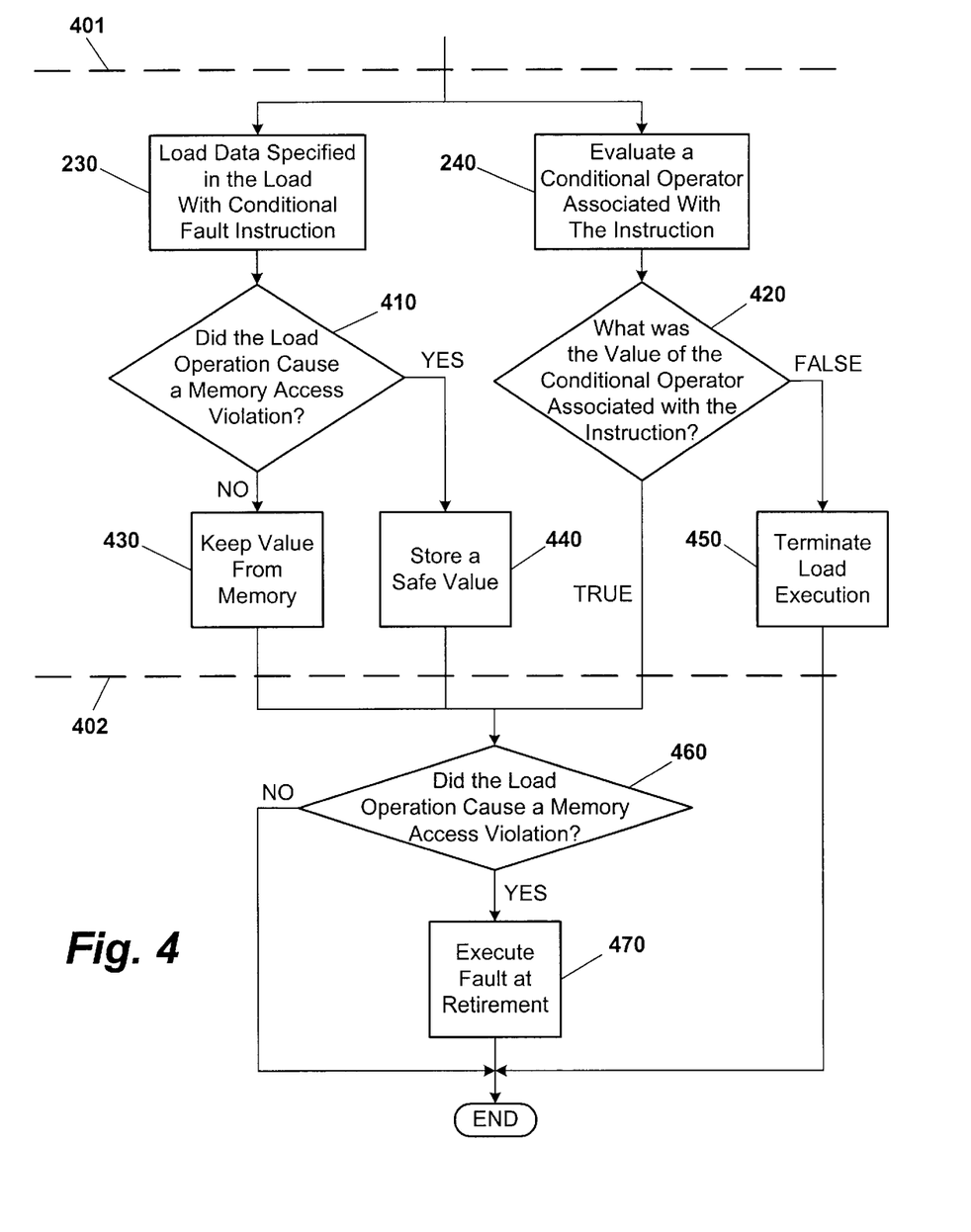
FIG. 4 is a flow diagram of a performant, but non-deterministic method of operation for a load with conditional fault instruction in a processor, in accordance with an embodiment of the present invention.

FIG. 4 is a flow diagram of a performant, but non-deterministic method of operation for the load with conditional fault instruction in FIG. 2, in accordance with an embodiment of the present invention. As in FIG. 3, in FIG. 4, the load operation execution 230 and the conditional operator evaluation 240 are provided for the sake of clarity and remain unchanged from FIG. 2, and additional detail has been provided for determining 250 whether to keep or replace the loaded data and whether to fault the instruction. In FIG. 4, dashed lines 401 and 402 indicate the any-order execution "level" for some of the operations in this embodiment.

In FIG. 4, after the load operation is executed 230, a check is made to determine if the load operation caused a memory access violation 410. If it is determined 410 that NO, a memory access violation did not occur, keep 430 the data obtained from the load operation in the destination register and if the conditional operator value from 420 is TRUE and NO memory access violation occurred 460, then, the instruction can be retired. If it is determined 410 that YES, a memory access violation did occur, a safe value can be stored 440 in the destination register and if the conditional operator value from 420 is TRUE and NO memory access violation occurred 460, then, execute the fault 470 and the instruction can be retired. In FIG. 4, after execution of the evaluate a conditional operator operation 240, a check is made to determine if the value of the conditional operator 420. If it is determined 420 that the value of the conditional operator is FALSE, the load execution is terminated 450 and the instruction is retired. In this case, the contents of the destination register are unknown since the load operation was terminated 450 without regard to the status of the load operation 230.

In FIG. 4, in addition to the load operation execution 230 and the conditional operator evaluation 240, the determine if the load operation caused a memory access violation 410, the determine the value of the conditional operator 420, the keep 430 the data obtained from the load operation, the store a safe value 440 and the terminate the load execution 450 are shown within the any-order execution level, as a result, all of these operations can be executed in any order.

Figure 5:
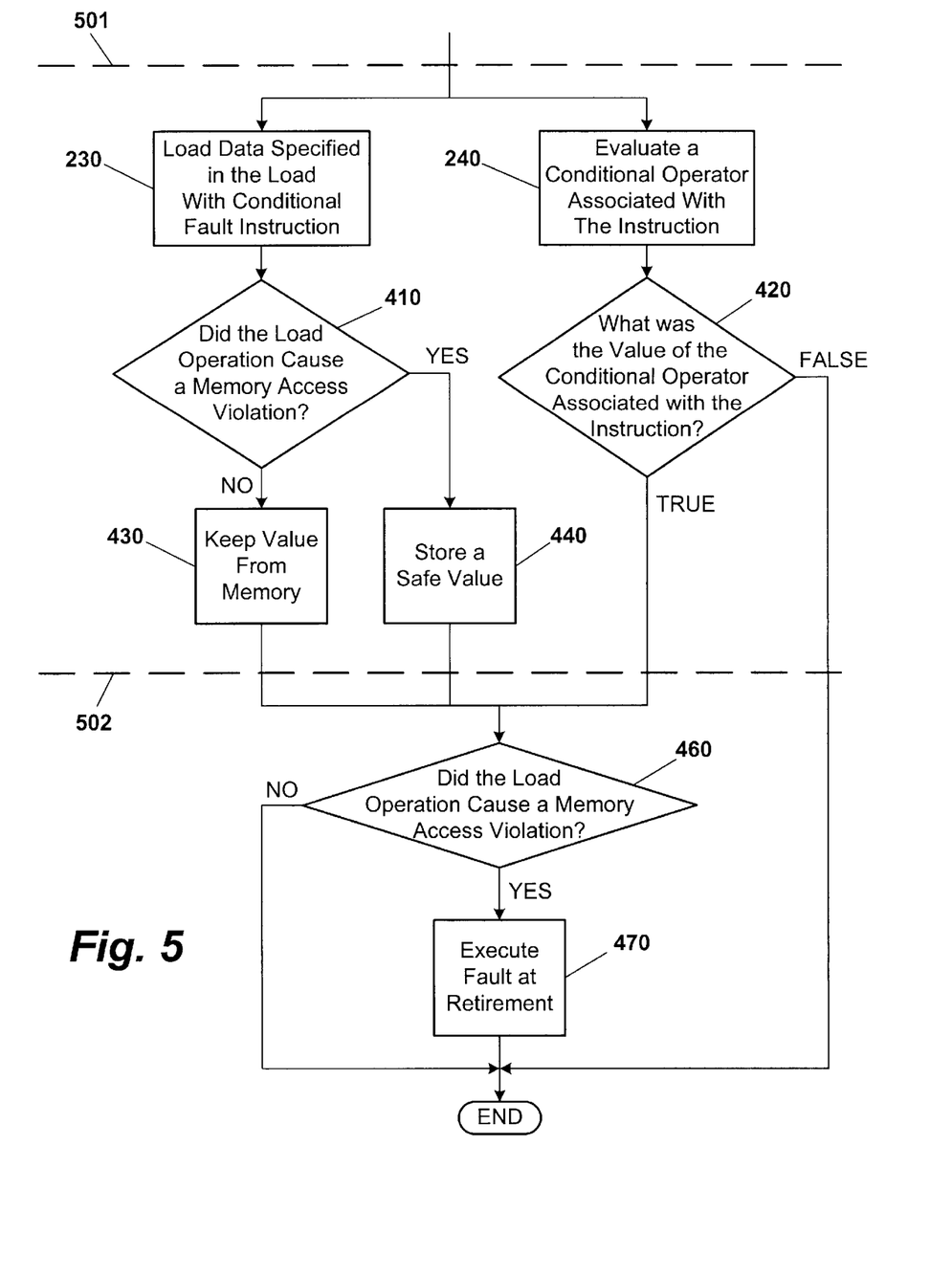
FIG. 5 is a flow diagram of a performant and deterministic method of operation for a load with conditional fault instruction in a processor, in accordance with an embodiment of the present invention.

FIG. 5 is a flow diagram of a performant and deterministic method of operation for the load with conditional fault instruction in FIG. 2, in accordance with an embodiment of the present invention. In FIG. 5, dashed lines 501 and 502 indicate the any-order execution "level" for some of the operations in this embodiment. The operation of the method of FIG. 5 is essentially the same as described above for FIG. 4 with the exception that, in FIG. 5, the terminate load execution 550 operation is not included when it is determined 520 that the conditional operator value is FALSE.

In accordance with an embodiment of the present invention, a method for providing a load with conditional fault instruction in a processor includes decoding an instruction set, where the instruction set includes an operation code to indicate a load with conditional fault instruction. The load with conditional fault instruction is also associated with a conditional operator which specifies the load behavior. The method and system further include decoding an instruction as a load with conditional fault instruction, loading a data value specified by the load with conditional fault instruction and determining whether to keep or replace the loaded data value.

In accordance with an embodiment of the present invention, a computer-readable medium stores instructions adapted to be executed by a processor, the instructions which, when executed, define a series of steps to provide a load with conditional fault instruction in a processor including decoding an instruction set, where the instruction set includes an operation code to indicate a load with conditional fault instruction. The load with conditional fault instruction is also associated with a conditional operator which specifies the load behavior. The method and system further include decoding an instruction as a load with conditional fault instruction, loading a data value specified by the load with conditional fault instruction and determining whether to keep or replace the loaded data value.

In accordance with an embodiment of the present invention, a method for encoding an instruction to enable the conditional loading of a data value, including associating a conditional operator within a load instruction, where the conditional operator provides information related to the behavior of the load instruction. The method further includes enabling evaluation of the conditional operator to determine a value for the behavior of the load instruction and enabling replacement of data obtained by the load instruction based on the value of the conditional operator.

In accordance with an embodiment of the present invention, a processor system includes a processor, a system memory coupled to the processor and a non-volatile memory coupled to the processor in which is stored an article of manufacture including instructions adapted to be executed by the processor, the instructions which, when executed, define a series of steps to provide a load with conditional fault instruction in a processor including decoding an instruction set, where the instruction set includes an operation code to indicate a load with conditional fault instruction. The load with conditional fault instruction is also associated with a conditional operator which specifies the load behavior. The method and system further include decoding an instruction as a load with conditional fault instruction, loading a data value specified by the load with conditional fault instruction and determining whether to keep or replace the loaded data value.

While the embodiments described above relate to mainly to the most performant load with conditional fault instruction embodiments, they are not intended to limit the scope or coverage of the present invention. In fact, for example, the method described above can be implemented to always provide a deterministic result when a fault occurs, which, while the easiest implementation from a programming standpoint, may not provide the best performing solution.

It should, of course, be understood that while the present invention has been described mainly in terms of microprocessor-based and multiple microprocessor-based personal computer systems, those skilled in the art will recognize that the principles of the invention, as discussed herein, may be used advantageously with alternative embodiments involving other integrated processor chips and computer systems. Accordingly, all such implementations which fall within the spirit and scope of the appended claims will be embraced by the principles of the present invention.

What is claimed is:

1. A machine-readable medium having stored thereon executable instructions to perform a method comprising:
   associating a conditional operator within a load instruction, said conditional operator to provide information related to behavior of the load instruction;
   enabling evaluation of the conditional operator to determine a value for the behavior of the load instruction; and
   enabling replacement of data obtained by the load instruction based on the value of the conditional operator.

2. The machine-readable medium of claim 1 wherein the method further comprises:
   enabling a data value obtained by the load instruction to be made available for use prior to the evaluation of the conditional operator.

3. The machine-readable medium of claim 1 wherein the load instruction comprises:
   reading the data value; and
   storing the data value in a destination location specified in the load instruction.

4. The machine-readable medium of claim 1 wherein enabling replacement of data obtained by the load instruction based on the value of the conditional operator comprises:
   storing a predetermined value in a destination location specified in the load instruction.

5. The machine-readable medium of claim 1 wherein the predetermined value is a deterministic value.

6. The machine-readable medium of claim 1 wherein the predetermined value is a prior value of the destination register.

7. A computer system comprising:
   a processor;
   a system memory coupled to the processor; and
   a machine-readable medium coupled to the processor, said machine-readable medium having stored thereon a plurality of executable instructions to perform a method comprising:
   associating a conditional operator within a load instruction, said conditional operator to provide information related to behavior of the load instruction;
   enabling evaluation of the conditional operator to determine a value for the behavior of the load instruction; and
   enabling replacement of data obtained by the load instruction based on the value of the conditional operator.

8. The computer system of claim 7 wherein the method further comprises:
   enabling a data value obtained by the load instruction to be made available for use prior to the evaluation of the conditional operator.

9. The computer system of claim 7 wherein the load instruction comprises:
   reading the data value; and
   storing the data value in a destination location specified in the load instruction.

10. The computer system of claim 7 wherein the enabling replacement of data obtained by the load instruction based on the value of the conditional operator comprises:
    storing a predetermined value in a destination register specified in the load instruction.

11. The computer system of claim 10 wherein the predetermined value is a deterministic value.

12. The computer system of claim 10 wherein the predetermined value is a prior value of the destination register.

13. A processor comprising:
    a decode unit to receive a load with conditional fault instruction to cause said processor to associate a conditional operator within a load instruction, said conditional operator to provide information related to behavior of the load instruction;
    enable evaluation of the conditional operator to determine a value for the behavior of the load instruction; and
    enable replacement of data obtained by the load instruction based on the value of the conditional operator.

14. The processor of claim 13 wherein the load with conditional fault instruction is to further cause said processor to enable a data value to be obtained by the load instruction to be made available for use prior to the evaluation of the conditional operator.

15. The processor of claim 13 wherein the load instruction comprises:

reading the data value; and storing the data value in a destination location specified in the load instruction.

16. The processor of claim 13 wherein enabling replacement of data obtained by the load instruction based on the value of the conditional operator comprises:

storing a predetermined value in a destination register specified in the load instruction.

17. The processor of claim 16 wherein the predetermined value is a deterministic value.

18. The processor of claim 16 wherein the predetermined value is a prior value of the destination register.

19. A method comprising:

associating a conditional operator within a load instruction, said conditional operator to provide information related to the behavior of the load instruction;

enabling evaluation of the conditional operator to determine a value for the behavior of the load instruction; and enabling replacement of data obtained by the load instruction based on the value of the conditional operator.

20. The method of claim 19 further comprises:

enabling a data value obtained by the load instruction to be made available for use prior to the evaluation of the conditional operator.

21. The method of claim 19, said load instruction, comprises:

reading the data value; and storing the data value in a destination location specified in the load instruction.

22. The method of claim 19, said enabling replacement of data obtained by the load instruction based on the value of the conditional operator comprising:

storing a predetermined value in a destination register specified in the load instruction.

23. The method of claim 22, wherein the predetermined value is selected from the group comprising:

a deterministic value; and a prior value of the destination register.

* * * * *